FIG. I.

Frank R. F. Ramsay, Inventor

Inventor
FRANK R. F. RAMSAY

Patented Nov. 8, 1949

2,487,070

UNITED STATES PATENT OFFICE 2,487,070

APPARATUS FOR TESTING THE ELECTRICAL IGNITION SYSTEMS OF INTERNAL-COMBUSTION ENGINES

Frank Raymond Faber Ramsay, London, England, assignor to D. Napier & Son Limited, London, England, a British company Application March 21, 1946, Serial No. 655,975
In Great Britain January 17, 1946

6 Claims. (Cl. 175—183)

This invention relates to apparatus for testing the electrical ignition systems of multi-cylinder internal combustion engines of the kind to which the present applicant's United States patent application Serial No. 520,716, filed February 1, 1944, now Patent No. 2,450,164, granted September 28, 1948, relates, that is to say of the kind including an oscillograph, means for connecting the oscillograph to the ignition apparatus so as to receive impulses and give indications representing the impulses delivered to the sparking plugs and means for synchronising the time base of the oscillograph with the cycle of the engine so that figures representing the impulses from a series of sparking plugs are produced by the trace in sequence on the screen of the cathode ray tube or its equivalent.

For the sake of convenience in the present specification and accompanying claims the term "deflector Y plate" will be used to indicate the point of the oscillograph circuit to which the impulses are delivered and the term "X plate" will be used for the plate or its equivalent the voltage on which acts at right angles to the voltage on the deflector Y plate. Further the circuit in which the impulses are generated and transmitted from the ignition system to the deflector Y plate will be referred to as the input circuit.

When such apparatus is used with coil ignition so that all the impulses are of the same polarity, all the figures appear on one side of the datum line on the screen, for example above it, while when used with a magneto the figures representing successive impulses appear on opposite sides of the datum line. On an engine having an even number of cylinders although consecutive impulses being of opposite polarity appear respectively above and below the datum line, the corresponding sparking plugs can be readily identified since the figure produced by the impulses for any one sparking plug always appears in the same position so that, even when the engine is running comparatively slowly and the persistence of vision does not give the impression of perfect continuity, yet the reading and interpretation of the complete multi-impulse figure appearing on the oscillograph screen is comparatively easy.

When however such apparatus is used with an engine having magneto ignition and an odd number of cylinders consecutive impulses delivered to any one sparking plug are of opposite polarity and therefore appear on opposite sides of the datum line. When the engine is operating comparatively fast this gives, owing to persistence of vision, the impression of a double figure for the impulses of each sparking plug one half of which is the mirror image of the other so that reading and interpretation of each individual sparking plug figure is comparatively easy. When the engine is running slowly, however, as is necessary when testing ignition apparatus fully an optical illusion occurs due to the comparatively long interval between consecutive traces of each individual impulse figure in the same position. This interval which it will be seen corresponds to two complete engine cycles makes each adjacent two or more individual figures appear to the eye to be one figure jumping from place to place, the most usual illusion being that each adjacent pair of figures on one side of the datum line appear as one figure jumping from side to side.

This illusion makes it impossible to identify and interpret the individual impulse figures corresponding to the individual sparking plugs and it is the object of the present invention to overcome this difficulty and provide an apparatus of the kind referred to which will be equally suitable for all engines whether employing coil or magneto ignition and irrespective of the number of cylinders, and will provide a record which can be more readily read and interpreted when magneto ignition is used, even with engines having an even number of cylinders.

To this end in apparatus according to the present invention of the kind referred to for testing ignition systems of internal combustion engines the input circuit includes a full wave rectifier so that whether consecutive impulses are of the same or opposite polarity all the impulses produce deflections in the same direction from the datum line and all the individual impulse figures therefore appear on the same side of this line.

Preferably means are provided for applying a bias to the Y plate of the cathode ray tube so as to enable the datum line to be moved from the centre of the screen for the purpose of bringing the centre of the figures produced by the trace into the centre of the screen. This facilitates the examination of the figures and also if desired enables the figures to be enlarged by appropriate amplification within the limits of the screen as compared with the case where room for similar figures had to be allowed for both above and below the datum line.

In any case it may be desirable to include in the input circuit both a full wave rectifier and an amplifier which compensates for any loss of voltage due to the provision of the rectifier.

As in the apparatus forming the subject of

United States Patent No. 2,450,164 the impulses are conveniently derived from the low tension side of the ignition system while a triggering impulse is derived from one of the sparking plug leads. Further the apparatus preferably includes the various preferred features described and claimed in the specification of the above United States Patent No. 2,450,164 and, while the invention may be carried into practice in various ways two alternative embodiments of the invention embodying to a large extent the features described in the specification of the above United States Patent No. 2,450,164 are shown diagrammatically by way of example in the accompanying drawings in which:

Figure 1:
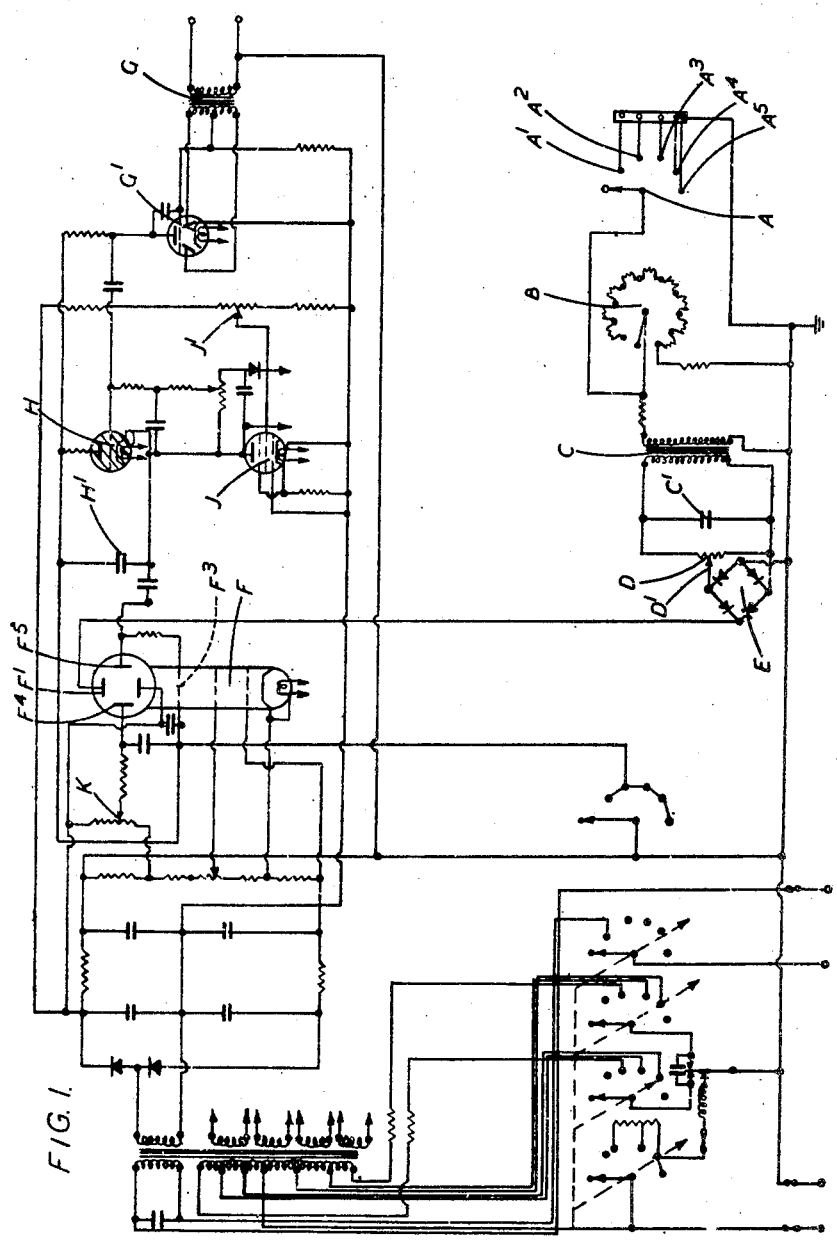
Figure 1 shows one form of apparatus according to the invention.

In the arrangement illustrated in Figure 1 the apparatus includes a selector switch A having a number of contacts $A^1$, $A^2$, $A^3$, $A^4$, $A^5$ which may be connected to the low tension circuit of a number of magnetos or coil ignition units, i. e. to the low tension circuits of four or more magnetos embodied in the dual ignition apparatus of an aircraft engine. Thus, the apparatus can either be connected to the circuit of a single magneto or coil which it is desired to test or may be connected through the selector switch to the various magneto circuits so that they can readily be tested in turn.

Shunted across the primary winding of the magneto or ignition coil selected is a variable resistance B having a number of tappings giving in a particular example resistances of say 18, 22, 28, 34, 48, 67, 76, 169 and 360 ohms and open circuit. It will thus be seen that by progressively varying the resistances B the impulses delivered to the sparking plugs can be progressively reduced or attenuated.

Also connected across the primary winding of the selected magneto or ignition coil is the primary winding of a transformer C, the secondary winding of which is shunted by a condenser $C^1$ of say 0.05 mfd. and a potentiometer D, the purpose of which is to vary the amplitude of the trace given on the screen of the oscillograph.

These components also serve as a filter circuit to remove high frequency loops and peaks which would otherwise render the interpretation of the trace and identification of faults therefrom difficult or impossible due to the form of the trace produced by the normal low tension impulses being distorted or fogged by high frequency impulses.

The potentiometer tapping $D^1$ is connected through a full wave metal oxide rectifier E to one of the vertical deflecting plates $F^1$ (referred to as the Y plate) of a cathode ray tube F whereof the anode $F^3$ is connected to earth.

From a chosen one of the sparking plugs a triggering impulse is tapped off to trigger the time base of the oscillograph. This impulse is fed in to the primary winding of a transformer G, the circuit including a resistance of some five megohms or a small capacity of some 15-30 microfarads shunted by a resistance of say 5 megohms as described in the specification of United States Patent No. 2,450,164. In addition as also described in the specification of United States Patent No. 2,450,164 it is preferred that the adaptor by which the triggering impulse is tapped from the sparking plug circuit is arranged to interrupt the lead to the sparking plug by means of a series spark gap to ensure that a triggering impulse is provided even if the particular sparking plug happens to be short-circuited.

The triggering impulse is rectified in order that it may function both with positive and negative spark impulses, any suitable form of rectifier being used, i. e. one comprising a double diode triode $G^1$ of known type, as described in United States Patent No. 2,450,164. Thus, the secondary winding of the transformer G is preferably centre-tapped and has its ends connected respectively to the diodes while the centre tapping is connected to the grid and through resistances to the cathode, thereby passing the rectified impulse to the grid.

As in United States Patent No. 2,450,164 the particular form of time base circuit per se forms no part of the present invention and only the main features thereof have therefore been described with reference to Figure 1.

The amplified impulse from the double diode triode $G^1$ is passed to the grid of a grid-controlled argon filled relay valve H of the type known as a G. T. I. C. and causes this valve to conduct provided the impulse is sufficiently in excess of the permanent grid bias on the gas relay valve. Across the anode circuit of this gas relay valve is a condenser $H^1$ of about one-tenth microfarad which is consequently discharged whereupon the fall of anode voltage causes the gas relay valve to become non-conductive again.

The condenser $H^1$ is connected across the high tension supply through a pentode J, the voltage variation across the condenser $H^1$ being applied to the horizontal deflector plates $F^4$, $F^5$ of the cathode ray tube F to form the time base. The voltage of the condenser $H^1$ during charging will thus be proportional to time while the discharge through the gas valve H provides the flash-back. The screen voltage of the pentode J is variable by means of a potentiometer $J^1$ to vary the time base.

A potentiometer K is provided whereby a bias can be applied to the X plate $F^4$ so as to enable the datum line of the trace to be adjusted so that the first figure in the row of figures occurs at the side of the screen, thus enabling the row of figures to be adjusted to occupy the whole width of the screen.

The apparatus can be connected to any suitable source of power, for example it may be built as a unit including batteries. In the arrangement shown, however, a power supply circuit is provided for supplying the various high tension and filament heating voltages from an input which may be either direct current from batteries, i. e. of 6, 12 or 24 volts or alternating current at 230 volts and 50 cycles.

The arrangement employed for this purpose is similar to that described in the specification of United States Patent No. 2,450,164 and will not therefore be herein further described since in itself it forms no part of the present invention.

Figure 2:
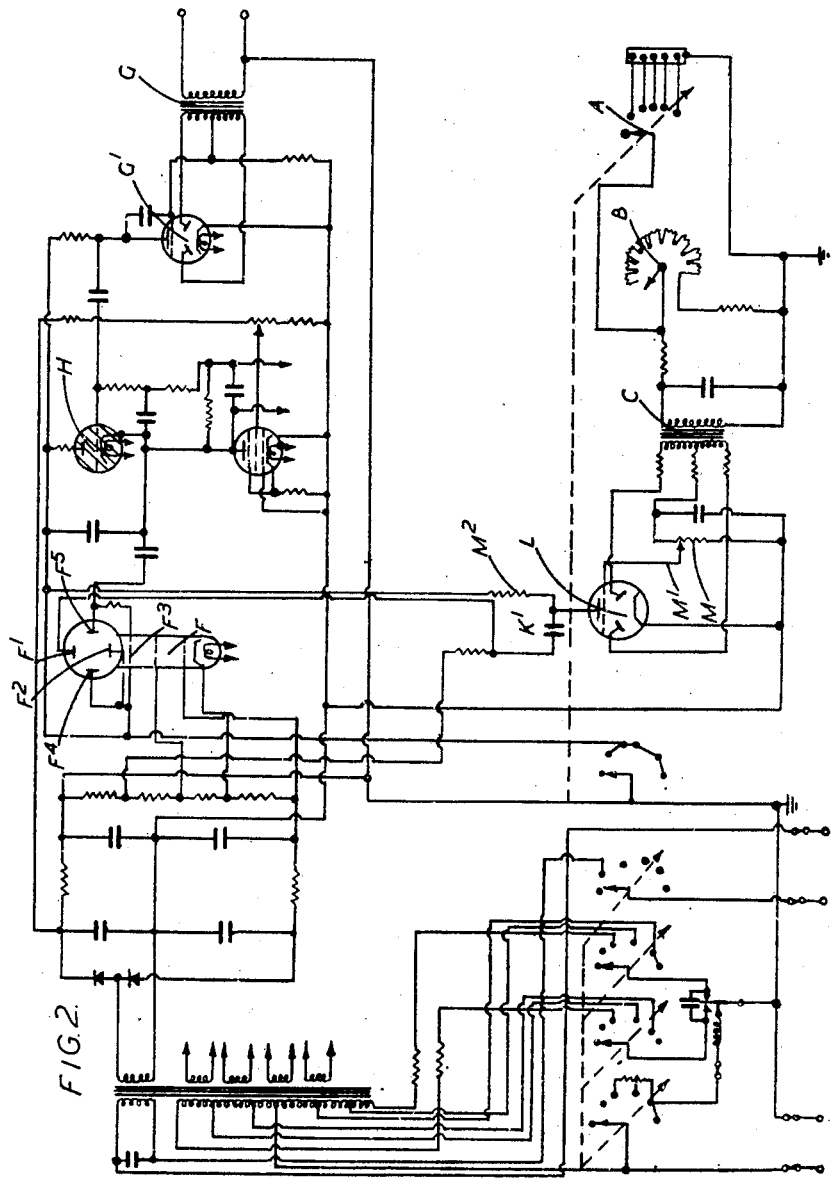
Figure 2 shows a modification of the arrangement shown in Figure 1.

In the modified arrangement illustrated in Figure 2 the circuit is in general similar to that shown in Figure 1 but with the following changes:

Instead of the metal oxide full wave rectifier a combined rectifier and amplifier is employed comprising a double diode L incorporating a triode amplifier. The ends of the secondary winding of the transformer are connected respectively to the diode anodes while a centre tapping is connected to a potentiometer M of which the tapping M¹ is connected to the grid. The rectified and amplified impulses from the diode triode are delivered through a condenser K¹ to the vertical Y plate F¹ of the cathode ray tube.

The amplifier is used in association with the rectifier for the purpose of compensating for the slight drop in voltage which would otherwise be caused by the insertion of the full wave rectifier while the variable resistance M enables the amplitude of the amplified signal applied to the vertical Y plate F¹ to be adjusted and hence the height of the figures to be varied.

Figure 3:
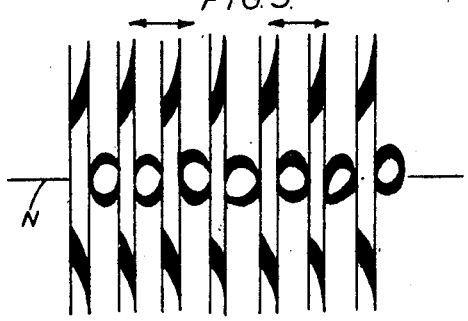
Figures 3 and 4 show respectively examples of the form of the figures obtained respectively with the known apparatus and with the present invention on an engine having magneto ignition and an odd number of cylinders.

Figure 3 shows the general type of figure which would be traced with apparatus of the kind in question not embodying the present invention from the magneto of an ignition system for a 7-cylinder engine. With this figure it will be seen that when the speed of the engine is slow consecutive impulses applied to any one sparking plug will appear respectively above and below the datum line indicated at N with the result that only every other impulse to a sparking plug appears in the same position. The result is that at slow speeds the interval between successive impulses is such that the appearance of continuity is lost and the illusion to the eye is of an impulse figure jumping from place to place with consequent confusion and the impossibility of identifying and examining the characteristics closely of any one impulse figure.

Figure 4:
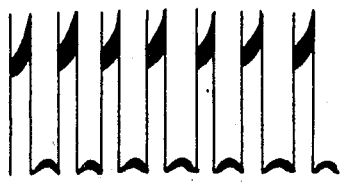

With the present invention, however, used with a similar ignition system a figure as shown in Figure 4 is traced and every impulse delivered to a given sparking plug appears in the same position thus doubling the number of traces in unit time in that position for a given speed and thus enabling the individual sparking plug impulses to be identified and interpreted readily.

Moreover, whether the apparatus is employed with the ignition system of an engine having an even or an uneven number of cylinders all the impulse figures appear on one side of the datum line. This enables adjacent impulse figures to be more readily compared and also, for a given size of screen, enables the amplitude of the figures to be increased so as to accentuate their characteristics.

It will be appreciated that the arrangements shown diagrammatically in the drawings are given by way of example only and that the position and arrangement of the rectifier with or without an amplifier as well as the means for providing a triggering impulse and other details may vary widely without departing from this invention. Thus, the exact form of rectifying and amplifying apparatus employed may be of various known types and for this reason only the main characteristics of the apparatus have been described since the details may be varied widely and will follow well known practice in the electronic art.

What I claim as my invention and desire to secure by Letters Patent is:

1. Apparatus for testing the ignition systems of internal combustion engines including a cathode ray tube, a time base circuit for said tube, means for synchronising the time base with the cycle of the engine, an input circuit for connecting the tube to the ignition apparatus so as to receive impulses and give indications representing the wave form of the impulses delivered to the sparking plugs, and a full wave rectifier included in the input circuit whereby, whether consecutive spark impulses are of the same or opposite polarity, all the impulses delivered to the tube give deflections of the trace in the same direction from a datum line.

2. Apparatus for testing the ignition systems of internal combustion engines including a cathode ray tube, a time base circuit for said tube, means for triggering the time base by an electrical impulse corresponding to that supplied to one of the sparking plugs, rectifying means in the circuit of the triggering impulse for ensuring that the time base is triggered irrespective of the polarity of the triggering spark impulse, an input circuit for connecting the tube to the ignition apparatus so as to receive impulses and give indications representing the wave form of the impulses delivered to the sparking plugs, and a full wave rectifier in the input circuit whereby, whether consecutive spark impulses are of the same or opposite polarity, all the impulses supplied to the tube produce deflections of the trace in the same direction from the datum line.

3. Apparatus for testing the ignition systems of internal combustion engines including a cathode ray tube, a time base circuit for said tube, means for triggering the time base by an electrical impulse corresponding to that supplied to one of the sparking plugs, a high impedance in the circuit of the triggering impulse to limit the loss of spark energy, an input circuit for connecting the tube to the ignition apparatus so as to receive impulses and give indications representing the wave form of the impulses delivered to the sparking plugs, and a full wave rectifier in the input circuit whereby, whether consecutive spark impulses are of the same or opposite polarity, all the impulses delivered to the tube produce deflections of the trace in the same direction from a datum line.

4. Apparatus for testing the ignition systems of internal combustion engines including a cathode ray tube, a time base circuit for said tube, means for synchronising the time base with the cycle of the engine, an input circuit for connecting the tube to the ignition apparatus so that it will receive impulses and give indications representing the wave form of the impulses delivered to the sparking plugs, filtering means in the input circuit for filtering out from the impulses delivered to the tube the high frequency loops, and a full wave rectifier in the input circuit whereby, whether consecutive spark impulses are of the same or opposite polarity, all the impulses delivered to the tube produce deflections of the trace in the same direction from a datum line.

5. Apparatus for testing the ignition systems of internal combustion engines including a cathode ray tube, a time base circuit for said tube, means for triggering the time base from an identifiable point in the cycle of the engine, an input circuit for connecting the tube to the low tension or primary side of the ignition apparatus so as to receive impulses and give indications representing the wave form of a succession of impulses delivered respectively to the several sparking plugs supplied by the ignition apparatus, attenuating means for progressively reducing the intensity of the impulses delivered to the sparking plugs so that they can be caused successively to fail to spark, and a full wave rectifier in the input circuit whereby, whether consecutive spark impulses are of the same or opposite polarity, all the impulses delivered to the tube produce deflections of the trace in the same direction from a datum line.

6. Apparatus for testing the ignition systems of internal combustion engines including a cathode ray tube, a time base circuit for said tube, means for triggering the time base from the circuit of one of the sparking plugs, an input circuit for connecting the tube to the low tension or primary side of the ignition apparatus so as to receive impulses and give indications representing the wave form of a succession of impulses delivered respectively to the several sparking plugs supplied by the ignition apparatus, filtering means in the input circuit for filtering out the loops due to high frequency oscillations in the ignition apparatus, attenuating means for progressively reducing the intensity of the impulses delivered to the sparking plugs whereby they can be caused successively to fail to spark, and a full wave rectifier in the input circuit whereby, whether consecutive spark impulses are of the same or opposite polarity, all the impulses delivered to the tube produce deflections of the trace in the same direction from a datum line.

FRANK RAYMOND FABER RAMSAY.

REFERENCES CITED

The following references are of record in the file of this patent:

UNITED STATES PATENTS

| Number | Name | Date |
|---|---|---|
| 2,094,472 | Rohats | Sept. 28, 1937 |
| 2,100,702 | Schlesinger | Nov. 30, 1937 |
| 2,178,471 | De Bruin | Oct. 31, 1939 |
| 2,188,845 | Ramsay | Jan. 30, 1940 |
| 2,355,363 | Christaldi | Aug. 8, 1944 |
| 2,366,355 | Roberts | Jan. 2, 1945 |
| 2,381,609 | McCoy | Aug. 7, 1945 |